(12) United States Patent
Rabinovich

(10) Patent No.: US 9,290,250 B2
(45) Date of Patent: Mar. 22, 2016

(54) AQUATIC APPARATUS FOR WAVE PROPULSION

(71) Applicant: Roman Rabinovich, Ashdod (IL)

(72) Inventor: Roman Rabinovich, Ashdod (IL)

(*) Notice: Subject to any disclaimer, the term of this patent is extended or adjusted under 35 U.S.C. 154(b) by 137 days.

(21) Appl. No.: 14/165,604

(22) Filed: Jan. 28, 2014

(65) Prior Publication Data

US 2015/0210371 A1    Jul. 30, 2015

(51) Int. Cl.
*B63B 35/83*  (2006.01)
*B63H 1/32*  (2006.01)
*B63B 35/79*  (2006.01)
*B63B 1/36*  (2006.01)

(52) U.S. Cl.
CPC .. *B63H 1/32* (2013.01); *B63B 1/36* (2013.01); *B63B 35/7926* (2013.01)

(58) Field of Classification Search
USPC ............... 441/17, 22, 79, 77; 440/21, 22
IPC ........... B63B 35/793, 35/7926, 1/36; B63H 1/32
See application file for complete search history.

(56) References Cited

U.S. PATENT DOCUMENTS

| 1,064,473 | A |   | 6/1913  | Haas |       |
|-----------|---|---|---------|----------|-------|
| 1,204,937 | A |   | 11/1916 | Carley   |       |
| 3,479,674 | A | * | 11/1969 | Beymer   | 441/77 |
| 4,077,077 | A | * | 3/1978  | Harper   | 441/79 |
| 4,892,493 | A | * | 1/1990  | Gil      | 440/17 |
| 5,462,466 | A | * | 10/1995 | Hull et al. | 441/76 |
| 7,112,108 | B2|   | 9/2006  | McMullen |       |

FOREIGN PATENT DOCUMENTS

BE  570555  9/1958
FR  2748985  11/1997

* cited by examiner

*Primary Examiner* — Stephen Avila
(74) *Attorney, Agent, or Firm* — Patwrite LLC; Mark David Torche

(57) ABSTRACT

It is an object of the subject matter to disclose an aquatic apparatus comprising a fin connected to a bottom of the an aquatic device; a flap connected to the fin, wherein the flap is connected at a leading end of the flap to the fin by one or more connectors, wherein the connectors enable the flap to rotate according to water current; one or more cables connected to a trailing end of the flap, wherein each cable of the one or more cables connects the flap the fin; said one or more cables comprising a predetermined length to enable the flap to open and close.

20 Claims, 5 Drawing Sheets

AQUATIC APPARATUS FOR WAVE PROPULSION

FIELD OF THE INVENTION

The subject matter relates generally to an aquatic apparatus connected to an aquatic device to improve the aquatic device's wave propulsion.

BACKGROUND OF THE INVENTION

Aquatic devices such as boats and surfboards require a fin which facilitates maneuvering of the aquatic device in water. The fin is attached to a bottom of the aquatic device to improve the control on the aquatic device when moving through the water with as little resistance as possible. In some cases the fin is moveable to allow stirring of the aquatic device in the water. The fin may be located on an bottom portion of the aquatic device depending on where the fin provides the best control of the aquatic device. For example, a sail boat would have the fin at a back end of the boat, to enable the boat to perform sharper or wider turns, depending on how the boat is stirred. Sailboats rely on wind to move the boat when the boat is moving against the current. Surfers rely on manual paddling and mechanical boats rely on a motor to push the boat when moving against the current.

In some situations, especially in sailboats and sailboards, a sail or mast is lost or destroyed, or there is a lack of wind power for propelling the sailboats or sailboards. Under such circumstances it frequently becomes necessary for the passenger of the aquatic device to row the sailboat to shore by a pair of single-bladed oars pivoted to side oarlocks, or to paddle the sailboard to shore by a double bladed paddle, or by hand.

SUMMARY

It is an object of the subject matter to disclose a An aquatic apparatus comprises a fin connected to a bottom of the an aquatic device; a flap connected to the fin, wherein the flap is connected at a leading end of the flap to the fin by one or more connectors, wherein the connectors enable the flap to rotate according to water current; one or more cables connected to a trailing end of the flap, wherein each cable of the one or more cables connects the flap the fin; said one or more cables comprising a predetermined length to enable the flap to open and close.

In some cases the bottom of the aquatic device is molded with the fin. In some cases the flap opens to a predefined angle from the fin. In some cases the one or more connectors are hinges. In some cases the flap is connected to the bottom by one or more springs. In some cases the flap is connected to the bottom by one or more bars. In some cases the flap is composed of rubber to make the flap flexible to prevent it from breaking where water current is strong.

It is another objective of the subject matter to disclose a flap connected extending downwards from a bottom of an aquatic device, wherein the flap is connected to the bottom of the aquatic device by one or more connectors, wherein the connectors enable the flap to rotate according to water current; one or more cables connected to a trailing end of the flap, wherein each cable of the one or more cables connects the flap to the bottom of the aquatic device; said one or more cables comprising a predetermined length to enable the flap to open and close: wherein the flap opens when the aquatic device travels along a direction of water current and closes when the aquatic device travels against the direction of water current.

In some cases the flap opens to predefined angle from the bottom of the aquatic apparatus. In some cases the one or more connectors are hinges. In some cases the flap is connected to the bottom by one or more springs. In some cases the flap is connected to the bottom by one or more bars.

It is another objective of the subject matter to disclose an aquatic apparatus comprising a fin connected to a bottom of an aquatic device; wherein the fin comprises one or more openings; a covering mechanism that covers the one or more openings to increase and decrease velocity of the aquatic device according to a direction of a water current, wherein the covering mechanism is connected to the fin by one or more connectors.

In some cases the covering mechanism is closed to cover the one or more openings when the direction of the water current is in a direction of motion of the aquatic device.

In some cases the covering mechanism opens to enable water to flow through the one or more openings when the direction of the water current is opposite a motion of the aquatic device.

In some cases the covering mechanism comprises one or more flaps are connected to the fin, wherein each flap of the one or more flaps is connected to the fin by the one or more connectors, wherein the one or more connectors enable the one or more flap to rotate according to water current; wherein each flap of the one or more flaps covers an opening of the one or more openings; wherein said one or more connectors enable the each flap of the one or more flaps to open and close the one or more openings.

In some cases the each flap of the one or more flaps opens and closes independently of other flaps of the one or more flaps.

In some cases the one or more connectors are hinges.

In some cases the covering mechanism is connected to the fin by one or more springs.

In some cases the covering mechanism is connected to the fin by one or more bars.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

The subject matter discloses an aquatic apparatus connected to an aquatic device for improvement of the aquatic devices wave propulsion, according to some non-limiting exemplary embodiments.

The aquatic apparatus comprises a fin, flaps, cables, or the combination thereof to enable an aquatic device to propel through water using water currents and the motion of water currents and water waves. The aquatic device in embodiments disclosed herein enables the aquatic device to move in an opposite direction of water currents while creating minimal resistance to the movement of the aquatic device. Where the water current moves in a same direction as the aquatic device, the surface area of the aquatic apparatus is enlarged to increase the aquatic device's surface such that the water current pushes against the flaps and propels the aquatic device at a higher velocity. In some exemplary embodiments of the subject matter, the aquatic device is moving through waves, where the wave motion enables the aquatic apparatus to increase propulsion of the aquatic device through to the movement of the wave. For example, where the aquatic device is moving against the direction of the wave, i.e. from a coast, the aquatic apparatus reduces the resistance of the oncoming wave to the aquatic apparatus. The current of the wave returning from the coast opens the aquatic apparatus and pushes against it to propel the aquatic device through the water.

Figure 1:
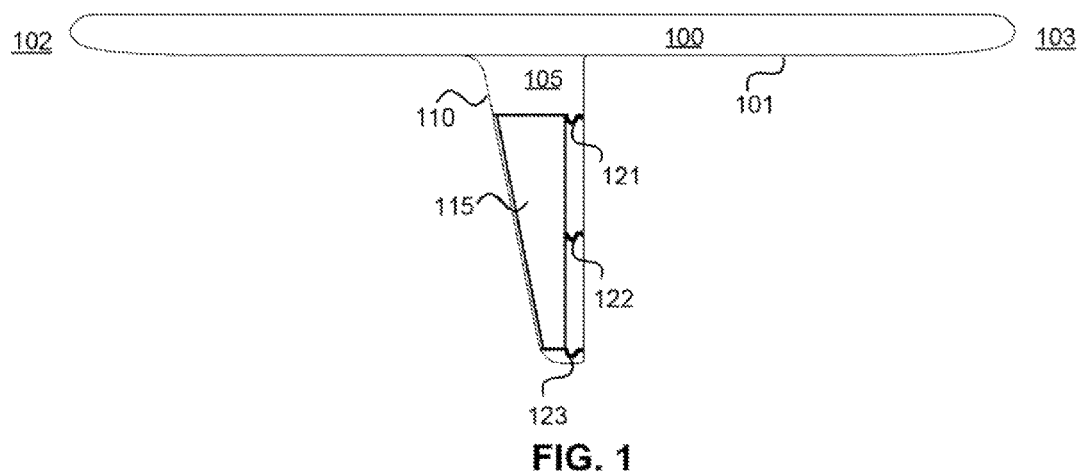
FIG. 1 shows an aquatic device with an aquatic apparatus attachment, according to some exemplary embodiments of the subject matter.

FIG. 1 shows an aquatic device with an aquatic apparatus attachment, according to some exemplary embodiments of the subject matter. The aquatic device 100 may be a boat, a surfboard, or the like. The aquatic apparatus 105 is connected to a bottom 101 of the aquatic device 100, such that when the aquatic device 100 is floating on water, the aquatic apparatus 105 is submerged. The aquatic apparatus 105 extends downwards from the bottom 101 of the aquatic device 100. The aquatic apparatus 105 comprises a fin 110, which is a body of the aquatic apparatus 105. The fin 110 may be constructed from the same material the aquatic device 100 is constructed. In some exemplary cases, the fin 110 is molded as part of the bottom 101. The fin 110 comprises a flap 115, which is connected to the fin 110 on a leading end 102 by one or more connectors (not shown), such as hinges. The connectors enable the flap 115 to rotate in an opening and closing motion, which increase or reduce the surface area on which water current may push against the flap 115. The flap 115 connects to the fin 110 at a trailing end 103 by one or more cables, for example, a first cable 121, a second cable 122, and a third cable 123. The one or more cables are arranged across a length of the flap 115, for example, where the flap 115 is 3 meters long, the one or more cables are connected to the flap 115 one meter apart. In some exemplary embodiments of the subject matter, the fin 110 comprises two flaps, where each flap of the two flaps is on an opposite side of the fin 110. In some exemplary embodiments of the subject matter, the one or more cables may be one or more springs, or one or more bars to connect the two flaps to the trailing end 103 of the fin 110. In some exemplary embodiments of the subject matter, the flap 115 is molded from rubber to make the flap 115 flexible and to prevent it from breaking when the water current may be very strong.

In Some exemplary embodiments of the subject matter, where there is no water current, or the water current is not strong enough to move the aquatic device 100, a user of the aquatic device 100 may create the water resistance to move the aquatic device 100. The user of the aquatic device may create resistance for the aquatic apparatus 105 by shifting weight from the leading end 102 of FIG. 1 to the trailing end 103 of FIG. 1 on the aquatic device 100. For example, the aquatic device 100 is a surfboard. The user lying on top of the surfboard continuously shifts the user's body weight from the leading end 102 to the trailing end 103 on the surfboard. The continuous motion creates water resistance against the flap 115, which enables the aquatic device 100 to move.

Figure 2A:
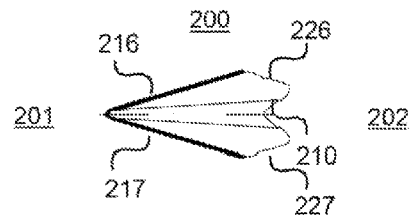
FIGS. 2A-2C show a top view of an aquatic apparatus, according to some exemplary embodiments of the subject matter.
Figure 2B:
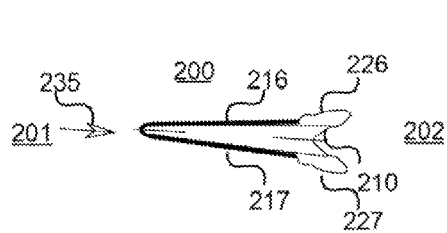

FIGS. 2A-2B show a top view of an aquatic apparatus, according to some exemplary embodiments of the subject matter.

FIG. 2A shows the top view of the aquatic apparatus 200 when the aquatic apparatus 200 is not affected by waves, according to some exemplary embodiments of the subject matter. The aquatic apparatus 200 comprises of a fin 210, which is connected to the aquatic device 100 of FIG. 1. The fin 210 is a centerpiece of the aquatic apparatus 200. Two flaps, for example, a first flap 216 and a second flap 217 are connected to opposite sides of the fin 210. The first flap 216 and the second flap 217 may be connected to the fin 210 with connectors (not shown), such as hinges, at a leading end 201 of the fin 210. The connectors enable the two flaps to rotate towards and away from the fin 210 according to the direction of the water current. In some cases, the first flap 216 and the second flap 217 may be molded from a single flap that is bended to envelope the fin 210. The first flap 216 and the second flap 217 are of an equal size on each side of fin 210 such that each flap of the first flap 216 and the second flap 217 comprises a same surface area. The fin 210 is connected to the two flaps by cables on a trailing end 202. For example, the first flap 216 is connected to the fin 210 by a first cable 226, and the second flap 217 is connected to the fin 210 by a second cable 227. The cables enable the two flaps to open and close according to the direction of water current. The cables comprise a predetermined length such that the two flaps open to a predefined angle. For example, each cable of the cables is half a meter long such that a flap of the two flaps can open only to a 60 degree angle from the fin 210. In some cases, other assemblies may be used to limit the movement of the flaps, such as bars connected to the fin 210, or springs.

FIG. 2B shows the top view of the aquatic apparatus 200 the two flaps are in a closed position, according to some exemplary embodiments of the subject matter. The aquatic device 100 is in water and a direction of the water current 235 is opposite to the direction in which the aquatic device 100 travels. The movement of the water current closes the flaps by pushing the flaps towards the fin 210. Closing of the two flaps reduces the water resistance to the aquatic device 100 and enables the aquatic device 100 to move faster through the water.

Figure 2C:
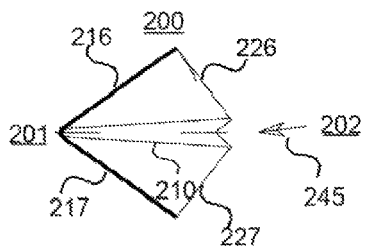

FIG. 2C shows the top view of the aquatic apparatus 200 the two flaps are in an opened position, according to some exemplary embodiments of the subject matter. The aquatic device 100 is in water and a direction of the water current is the same 245 as the direction of motion of the aquatic device 100. The movement of the water current opens the flaps by pushing the flaps away from the fin 210. Opening of the two flaps increases the water resistance enabling the aquatic device 100 to move faster through the water. The cables prevent the two flaps from flipping in a 180 degree manner. The length of the cables is predetermined to ensure that the ideal water resistance creates the most speed of the aquatic device 100.

Figure 3A:
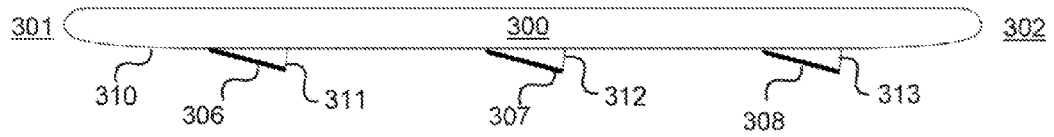
FIGS. 3A-3C show a plurality of aquatic apparatuses connected to an aquatic device, according to some exemplary embodiments of the subject matter.
Figure 3B:
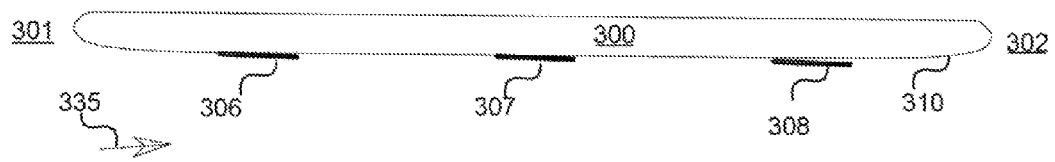
Figure 3C:
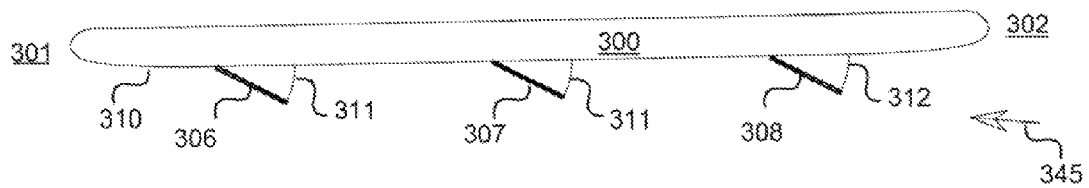

FIGS. 3A-3C show a plurality of aquatic apparatuses connected to an aquatic device, according to some exemplary embodiments of the subject matter.

FIG. 3A shows a side view of the plurality of aquatic apparatuses connected to the aquatic device 300, according to some exemplary embodiments of the subject matter. The aquatic device 300 may be a submarine, surfboard, a floating plank, a raft, or the like. In this non-limiting case, the aquatic apparatus does not comprise the fin 110 of FIG. 1. Instead, aquatic apparatuses may be connected directly to a bottom 310 of the aquatic device 300. For example, a first aquatic apparatus 306, a second aquatic apparatus 307, and a third aquatic apparatus 308 are connected to the bottom 310. It should be noted that only one aquatic apparatus needs to be connected to the bottom 310. However, use of more than one aquatic apparatuses enables the aquatic device 300 to move faster through the water, when the aquatic device 300 is moving in the direction of the water current. Each aquatic apparatus of the aquatic apparatuses is connected to the bottom 310 on a leading end 301 by a connector (not shown), such as a hinge. The connectors enable the aquatic apparatuses to rotate in an opening and closing motion, which increase or reduce the surface area on which water current may push against the an aquatic apparatus of the aquatic apparatuses.

Each aquatic apparatus of the aquatic apparatuses is connected to the bottom 310 on a trailing end 302 by a cable. For example, the first aquatic apparatus 306 is connected to the bottom 310 with a first cable 311; the second aquatic apparatus 307 is connected to the bottom 310 with a second cable 312; and, the third aquatic apparatus 308 is connected to the bottom 310 with a third cable 313. The cable enables an aquatic apparatus of the aquatic apparatuses to open and close according to the direction of the water current, as further disclosed in FIGS. 3B, 3C. It should be noted that each aquatic apparatus may be connected by one or more cables to the bottom 310 to prevent the aquatic apparatus from breaking loose in strong water currents. For example, where the aquatic apparatus is short, e.g. 50 centimeters long, only one cable would be required. However, where the aquatic apparatus is three meters long, three cables may be required to connect the aquatic apparatus to the bottom 310. In some exemplary embodiments of the subject matter, the one or more cables may be one or more springs, or one or more bars to connect the two flaps to a trailing end 302 of the bottom 310.

FIG. 3B shows a side view of closed aquatic apparatuses connected to the aquatic device 300, according to some exemplary embodiments of the subject matter. The aquatic device 300 is in water where a current, represented by an arrow 335, is moving opposite to a direction of the aquatic device 300. As the aquatic device 300 moves in the water, the aquatic apparatuses rotate and are close by the current. The aquatic apparatuses are closed such that each aquatic device rests on the bottom 310 of the aquatic device 300.

FIG. 3C shows a side view of opened aquatic apparatuses connected to the aquatic device 300, according to some exemplary embodiments of the subject matter. The aquatic device 300 is in water where a current, represented by a parallel arrow 345, is moving in a same direction of the aquatic device 300. As the aquatic device 300 moves in the water, the aquatic apparatuses rotate and are opened by the current. The aquatic apparatuses are opened such that the water current pushes on the each aquatic apparatus of the aquatic apparatuses, which increases the velocity of the aquatic device 300.

Figure 4A:
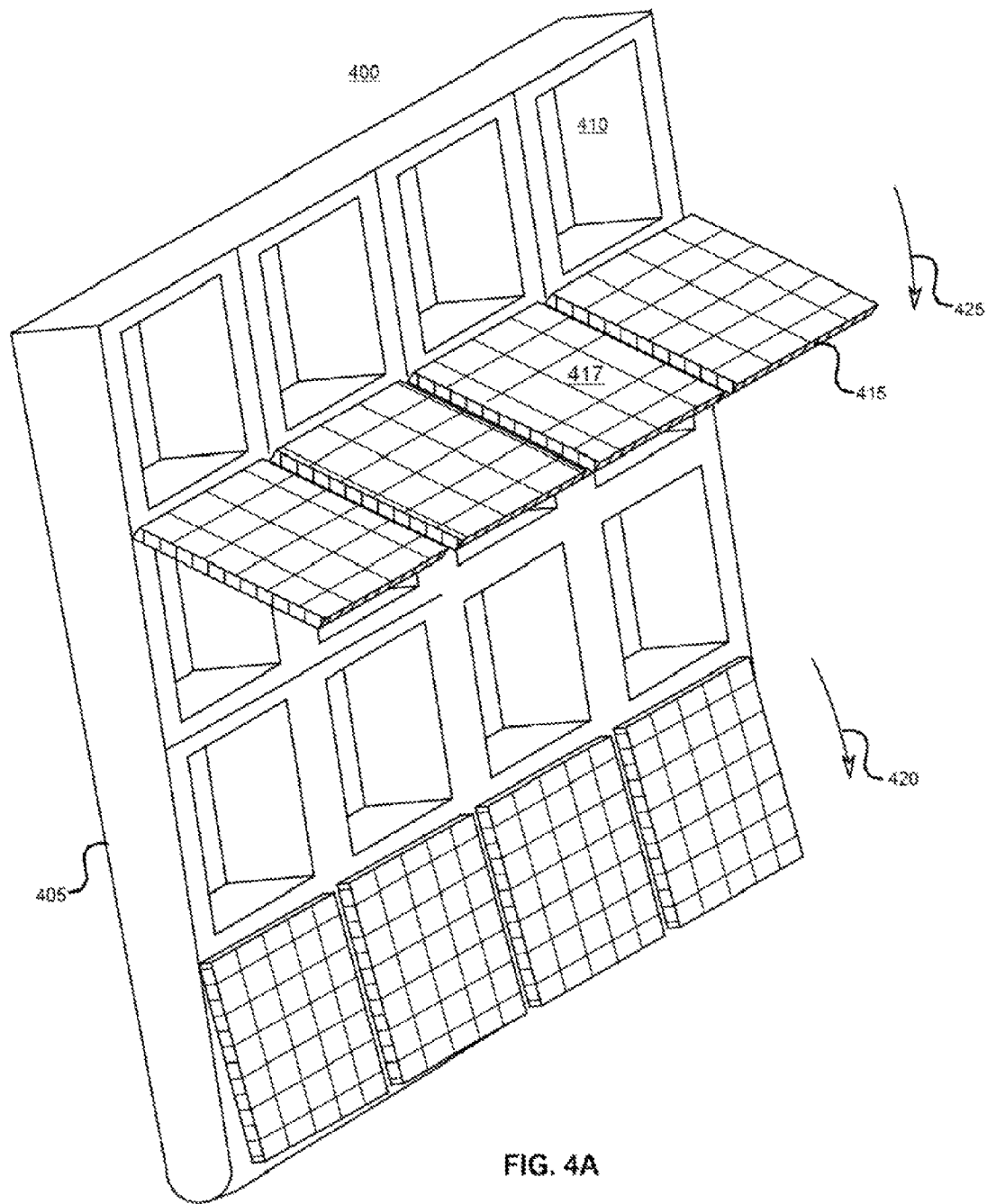
FIGS. 4A-4B show an aquatic apparatus comprising a plurality of flaps, according to some exemplary embodiments of the subject matter; and, FIG. 5A-5C shows a side view of an aquatic device with an aquatic apparatus comprising a plurality of flaps, according to some exemplary embodiments of the subject matter.

FIG. 4A shows an aquatic apparatus comprising a plurality of flaps, according to some exemplary embodiments of the subject matter. The aquatic apparatus 400 comprises a fin 405. The fin 405 comprises one or more openings 410 that enable water to flow through the fin 405. The one or more openings 410 may be aligned in a predetermined manner, for example, in rows and columns. The aquatic apparatus 400 is connected to the aquatic device 100 of FIG. 1. The aquatic apparatus comprises a covering mechanism 415. The covering mechanism 415 increases and decreases the velocity of the aquatic device by controlling the amount of water that passes through the one or more openings 410. The covering mechanism 415 is connected to the fin 405. The covering mechanism 415 enables increasing or decreasing water resistance to the fin according to a direction of the water current. When the direction of the water current is the same as the direction of the aquatic device 100 of FIG. 1 to which the covering mechanism 415 is closed. The surface area on which the water current pushes on the aquatic apparatus is increased and the greater force enables the aquatic device 100 to move faster through the water. When the direction of the water current is opposite to the direction of the aquatic device 100, the covering mechanism 415 is opened. Opening of the covering mechanism 415 enables water to flow through the covering mechanism 415 and reduce water resistance to the aquatic apparatus and enable the aquatic device 100 to move faster through the water.

In some exemplary embodiments of the subject matter, the covering mechanism comprises one or more flaps, such as a flap 417. The flap 417 of the one or more flaps functions independently of other flaps of the one or more flaps. Because the direction of water currents may vary as the aquatic device 100 moves in the water, each fin opens independently to create achieve the most velocity according to the water current. Each flap of the one or more covers one opening of the one or more openings 410. Each flap is connected to the fin 405 by one or more connectors (not shown).

Figure 4B:
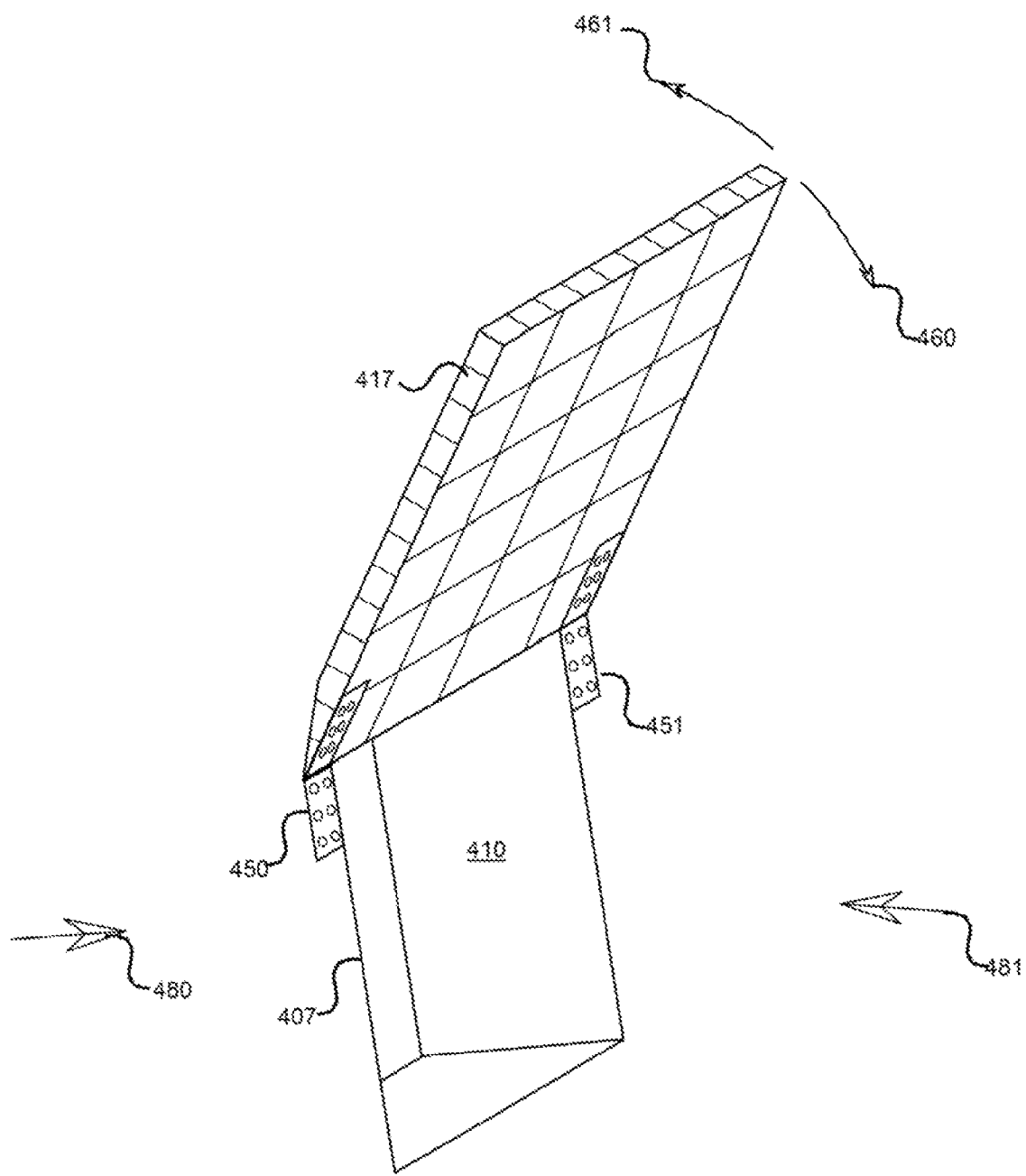

FIG. 4B shows the flap 417 and the opening 410 of the aquatic apparatus 400, according to some exemplary embodiments of the subject matter. The opening comprises a frame 407. The flap 417 is attached to the aquatic apparatus 400 by connectors, for example, a first hinge 450 on one end of the covering mechanism 415 and a second hinge 451 on a second end of the covering mechanism 415. The first hinge 450 and the second hinge 451 are connected on the frame 407. The first hinge 450 and the second hinge 451 enable the flap 417 to rotate in a vertical direction. For example, in cases where the water current flows through the opening in a direction as designated by the arrow 480 in the Figure, the flap 417 opens in a rising direction 461. In cases where the water current flows through the opening in a direction as designated by the arrow 481 in the Figure, the flap 417 closes in a falling direction 460.

Figure 5A:
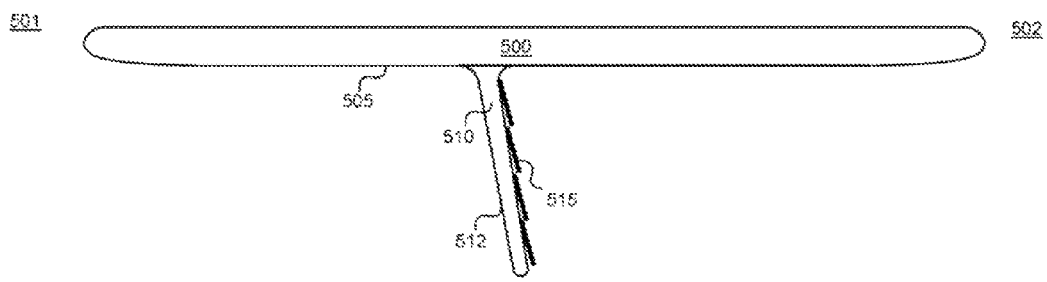
Figure 5B:
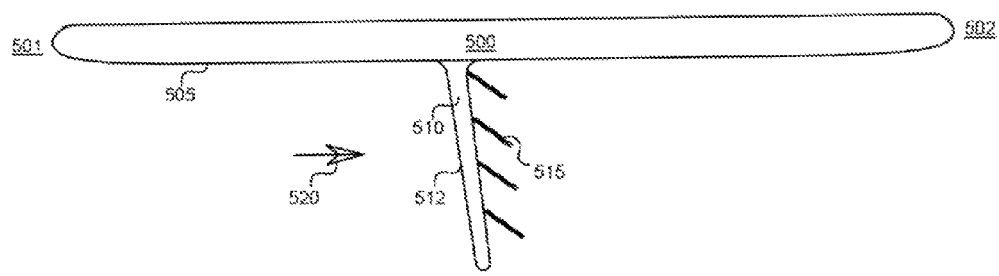
Figure 5C:
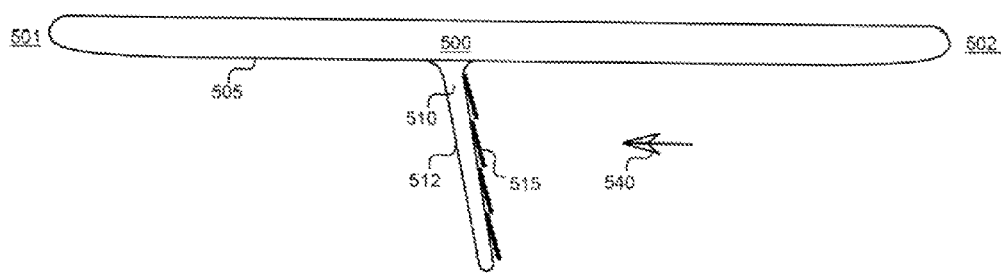

FIG. 5A-5C show a side view of an aquatic device with an aquatic apparatus comprising a plurality of flaps, according to some exemplary embodiments of the subject matter. FIG. 5A shows a side view of the aquatic device 500 comprising the aquatic apparatus 510, according to some exemplary embodiments of the subject matter. The aquatic apparatus 510 is shaped in the form of a fin 512, which is connected to a bottom 505 of the aquatic device 500. The aquatic apparatus 510 comprises a covering mechanism 515, which is connected to the fin 512.

FIG. 5B shows a side view of the aquatic device 500 comprising the aquatic apparatus 510 with covering mechanism 515, according to some exemplary embodiments of the subject matter. Water current, represented by an arrow 520, moves the aquatic device 500. The water current moves in an opposite direction of the aquatic device 500. As the aquatic device 500 moves in the water, the covering mechanism 515 is opened by the force of the water current pushing on the covering mechanism 515 opened.

FIG. 5C shows a side view of the aquatic device 500 comprising the aquatic apparatus 510 with the covering mechanism 515 closed, according to some exemplary embodiments of the subject matter. Water current, represented by an arrow 540, moves the aquatic device 500. The water current moves in a same direction of the aquatic device 500. As the aquatic device 500 moves in the water, the aquatic apparatuses are closed by the force of the water current pushing, the covering mechanism 515 closed.

While the disclosure has been described with reference to exemplary embodiments, it will be understood by those skilled in the art that various changes may be made and equivalents may be substituted for elements thereof without departing from the scope of the subject matter. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this subject matter, but only by the claims that follow.

The invention claimed is:

1. An aquatic apparatus comprising:
    a fin immovably connected to a bottom of an aquatic device;
    a flap connected to the fin, wherein the flap is connected at a leading end of the flap to the fin by at least one connector, wherein the at least one connector enables the flap to rotate according to water current;
    at least one cable connected to a trailing end of the flap, wherein said at least one cable connects the flap to the fin; said at least one cable comprising a predetermined length to enable the flap to open and close;
    wherein said aquatic apparatus is configured to be driven by wave propulsion.

2. The aquatic apparatus of claim 1, wherein the bottom of the aquatic device is molded with the fin.

3. The aquatic apparatus of claim 1, wherein the flap opens to a predefined angle from the fin.

4. The aquatic apparatus of claim 1, wherein the one or more connectors are hinges.

5. The aquatic apparatus of claim 1, wherein the flap is connected to the bottom by one or more springs, rendering said flap normally closed.

6. The aquatic apparatus of claim 1, wherein the flap is connected to the bottom by one or more bars.

7. The aquatic apparatus of claim 1, wherein the flap is composed of rubber to make the flap flexible to prevent it from breaking where the water current is strong.

8. An aquatic apparatus comprising:
    a flap connected extending downwards from a bottom of an aquatic device, wherein the flap is connected to the bottom of the aquatic device by one or more connectors, wherein the one or more connectors enable the flap to rotate according to water current;
    one or more cables connected to a trailing end of the flap, wherein each cable of the one or more cables connects the flap to the bottom of the aquatic device; said one or more cables comprising a predetermined length to enable the flap to open and close;
    wherein the flap opens when the aquatic device travels along a direction of water current and closes when the aquatic device travels against the direction of water current;
    wherein said aquatic apparatus is configured to be driven by wave propulsion.

9. The aquatic apparatus of claim 8, wherein the flap opens to predefined angle from the bottom of the aquatic apparatus.

10. The aquatic apparatus of claim 8, wherein the one or more connectors are hinges.

11. The aquatic apparatus of claim 8, wherein the flap is connected to the bottom by one or more springs, rendering said flap normally closed.

12. The aquatic apparatus of claim 8, wherein the flap is connected to the bottom by one or more bars.

13. An aquatic apparatus comprising:
    a fin immovably connected to a bottom of an aquatic device; wherein the fin comprises one or more openings;
    a covering mechanism that covers the one or more openings to increase and decrease velocity of the aquatic device according to a direction of a water current, wherein the covering mechanism is disposed on a bottom side of said aquatic device connected to the fin by one or more connectors;
    wherein said aquatic apparatus is configured to be driven by wave propulsion.

14. The aquatic apparatus of claim 13, wherein the covering mechanism is closed to cover the one or more openings when the direction of the water current is in a direction of motion of the aquatic device.

15. The aquatic apparatus of claim 13, wherein the covering mechanism opens to enable water to flow through the one or more openings when the direction of the water current is opposite a motion of the aquatic device.

16. The aquatic apparatus of claim 13, wherein the covering mechanism comprises: one or more flaps are connected to the fin, wherein each flap of the one or more flaps is connected to the fin by the one or more connectors, wherein the one or more connectors enable the one or more flaps to rotate according to the water current; wherein each flap of the one or more flaps is covering an opening of the one or more openings; wherein said one or more connectors enable the each flap of the one or more flaps open and close the one or more openings.

17. The aquatic apparatus of claim 16, wherein the each flap of the one or more flaps opens and closes independently of other flaps of the one or more flaps.

18. The aquatic apparatus of claim 13, wherein the one or more connectors are hinges.

19. The aquatic apparatus of claim 13, wherein the covering mechanism is connected to the fin by one or more springs.

20. The aquatic apparatus of claim 13, wherein the covering mechanism is connected to the fin by one or more bars.

* * * * *